Aug. 2, 1960 H. P. SMITH ET AL 2,947,369
SELF-COUPLING HITCH WITH OVERLOAD RELEASE
Filed March 13, 1956 2 Sheets-Sheet 1

INVENTORS:
Hiram P. Smith
Otto E. Johnson
Paul O. Pippel
Atty.

Aug. 2, 1960  H. P. SMITH ET AL  2,947,369
SELF-COUPLING HITCH WITH OVERLOAD RELEASE
Filed March 13, 1956  2 Sheets-Sheet 2

INVENTORS:
Hiram P. Smith
Otto E. Johnson
Paul O. Pippel
Atty.

United States Patent Office 2,947,369
Patented Aug. 2, 1960

2,947,369

SELF-COUPLING HITCH WITH OVERLOAD RELEASE

Hiram P. Smith, Chicago, and Otto E. Johnson, Canton, Ill., assignors to International Harvester Company, a corporation of New Jersey Filed Mar. 13, 1956, Ser. No. 571,254

3 Claims. (Cl. 172—269)

This invention relates to agricultural implements and particularly to plows. More specifically, the invention concerns a novel plow frame construction comprising separable hitch and tool-carrying portions which form an integral implement adapted for direct connection to a tractor in normal operation, and which will separate into its component parts when abnormal draft conditions are encountered to avoid damage to the implement and tractor attaching elements.

An object of the invention is the provision of a plow of improved construction adapted particularly for use where unusual or difficult plowing conditions are encountered.

Another object of the invention is the provision of a plow adapted for direct connection to a tractor to be lifted and carried thereon in transport, wherein implement attaching elements are provided on the tractor for integral and releasable connection with corresponding attaching elements on the plow, and wherein the plow is formed of two parts which remain together in normal operation but which separate under the influence of abnormal draft loads.

Other objects and advantages of the invention will become clear from the following detailed description when read in conjunction with the accompanying drawings, wherein.

Figure 1:
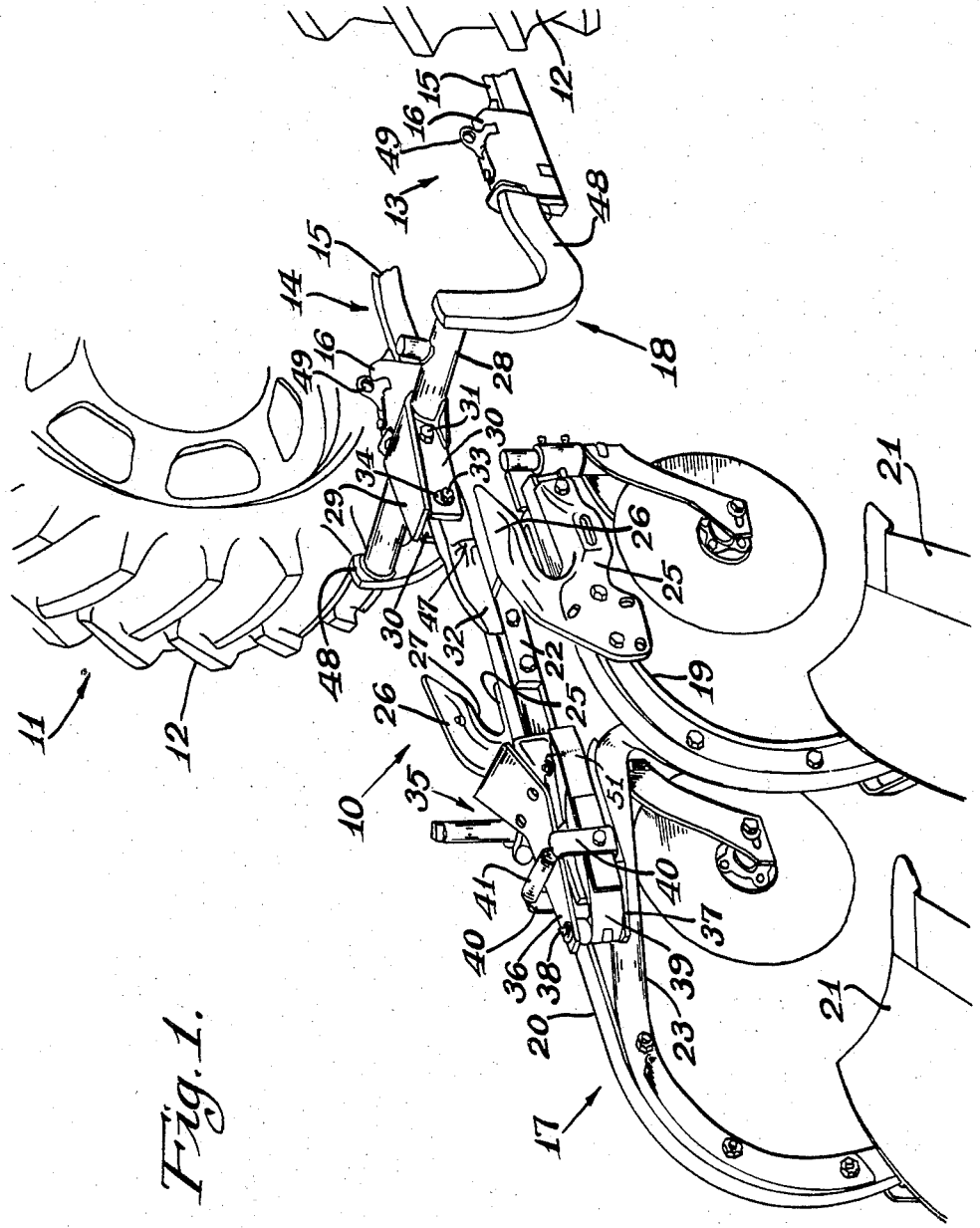
Figure 1 is a view in perspective showing the rear end of a tractor having an implement in the form of a moldboard plow embodying the features of this invention connected thereto.

Referring to the drawings, the plow of this invention is generally designated by the numeral 10 and is mounted upon a tractor, indicated at 11, having laterally spaced rear drive wheels 12 and an implement attaching structure 13. It may be understood that the implement attaching structure 13 of the tractor is of the type shown and described in copending U.S. application Serial No. 338,651 filed February 25, 1953, only a portion thereof being shown in Figure 1. It may also be understood that the implement attaching structure 13 of the tractor includes a drawbar 14 having laterally spaced rearwardly extending arms 15, to the rear ends of which are affixed longitudinally elongated socket members 16. It should be understood that the implement attaching structure 13 forms a part of the tractor, and that drawbar 14 may be raised and lowered between positions corresponding to transport and operating positions of an implement, by lift means not shown in the drawing, but illustrated and described in the copending application referred to above.

Figure 2:
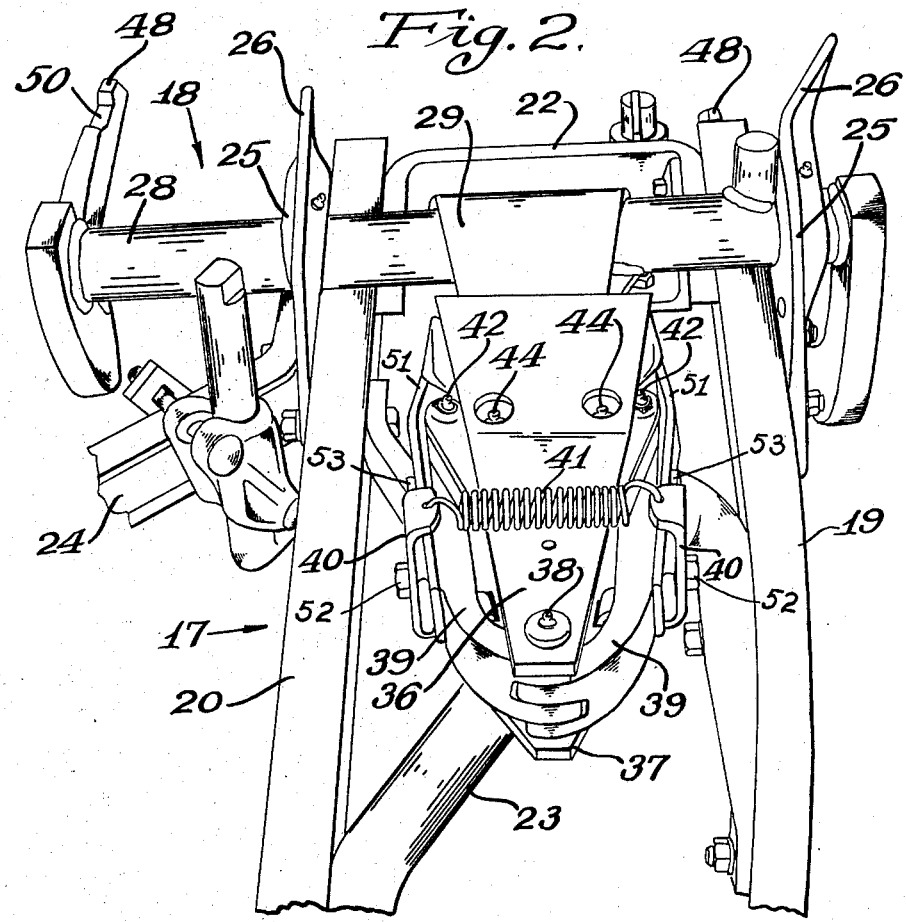
Figure 2 is an enlarged view in perspective from the rear of the plow shown in Figure 1.
Figure 3:
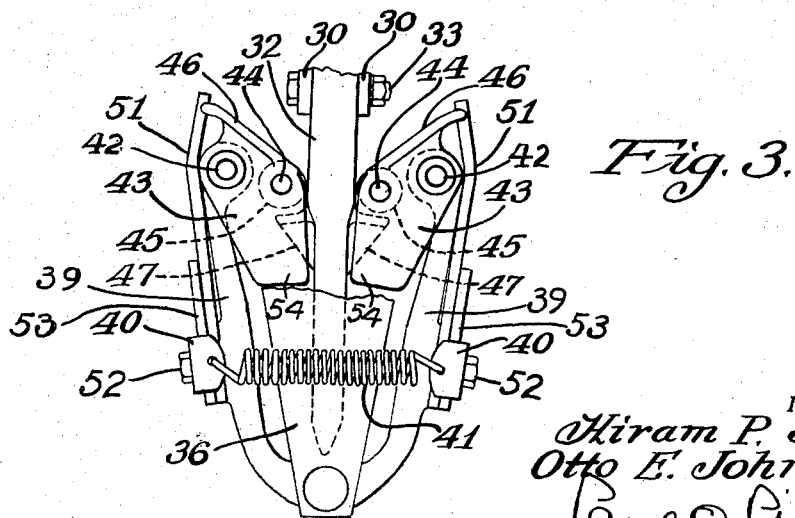
Figure 3 is a plan view, with parts broken away for clarity, of one of the socket members on the plow frame showing the manner in which the shaft is held in the socket.

The implement 10 with which this invention is concerned is a two-part plow comprising a main frame generally designated at 17 and a hitch frame 18. Frame 17 is a tool-carrying frame comprising laterally spaced longitudinally extending plow beams 19 and 20, beam 19 being relatively short and curved downwardly and forwardly at its rear end to support a plow bottom 21. Beam 20 is longer than beam 19 and likewise is curved downwardly and forwardly at its rear end to support a plow bottom 21. The forward ends of the beams are separated and braced by a U-shaped brace member 22, and a diagonal brace 23 connects the rear portion of beam 19 to the rear portion of beam 20. Although the plow shown in Figure 1 is a two-bottom moldboard plow, an additional plow bottom can be added by the provision of another longitudinally extending beam such as is indicated at 24 in Figure 2.

On the sides of the beams 19 and 20 are mounted a pair of brackets 25, each of which is provided with an upstanding and forwardly bent hook-like portion 26, each of which forms a recess or socket 27, the bottom of which is the base of bracket 25 and the upper face of the respective tool beams 19 and 20, and the purpose of which will hereafter become clear.

The hitch 18 forms the other part of plow 10 and comprises a transversely extending bar 28, round in cross section, having affixed thereto and extending rearwardly from the mid-portion thereof a plate 29 to which is affixed laterally spaced depending flanges 30 having a pivot bolt 31 extending therethrough, upon which is mounted the forward end of a rearwardly extending shaft member 32, which is fixedly held between the flanges 30 for limited vertical adjustment by a bolt 33 received in slots 34 in the flanges.

Shaft 32 is slidably receivable in a central socket member 35, located rearwardly of and between brackets 25 forming the sockets 27, and is mounted upon brace bar 23 connecting the rear ends of beams 19 and 20.

Socket member 35 comprises a pair of horizontal vertically spaced plates 36 and 37, the latter plate being affixed to brace 23 and connected at its rear end to the upper plate 36 by a pivot pin 38, and both plates are flared at their forward ends. The portion of pin 38 between plates 36 and 37 serves as a hinge pin for the rear inwardly curved ends of a pair of laterally spaced spreading jaws 39, to each of which is secured an upstanding lug 40, the upper ends of which are connected by a spring 41. At this point it should be clear that jaws 39 are capable of swinging open about the axis of pivot pin 38 against the bias of spring 41, the primary function of which is to bring the jaws 39 together.

The forward end of each of the jaws 39 supports a vertical spindle 42 upon each of which is mounted a pivoted auxiliary jaw member 43, which in turn carries a vertical spindle 44 upon which is mounted a latch member in the form of a roller 45. Pivoted jaw members 43 are provided with rearwardly converging broad faces 46 to facilitate reception of shaft 32. Shaft 32 is slidably received between the jaws 39 and engages latch members or rollers 45. As the shaft is received between the jaws, a pair of projections 47 serving as latch parts on opposite sides of the shaft also engage the rollers 45 and spread the jaws of the socket until the projections 47 pass beyond the rollers 45, whereupon the jaws close under bias of spring 41 and the projections 47 engaging rollers 45 prevent withdrawal of shaft 32.

When shaft 32 is received in socket 35, the terminal parts of transverse bar 28 are received in the sockets 27, the transverse bar resting upon the beams 19 and 20, forming an integral tool-carrying frame and hitch frame plow structure.

When the hitch frame 18 is connected to the main tool-carrying frame 17, a unitary moldboard plow is provided for attachment in draft-receiving relation to a tractor. For this purpose a pair of laterally spaced forwardly projecting shaft members 48 are provided which are upwardly curved at their rear ends and affixed by welding to the ends of the transverse bar 28. Shafts 48 are removably held in sockets 16 by latches 49 which cooperate with notches 50 in the shafts and function in any suitable manner such as is described in the copending application referred to above.

When the plow 10 is connected to the tractor attaching structure 13 it forms an integral attachment which can be raised and lowered when the implement attaching structure of the tractor is raised and lowered. Under normal draft conditions shaft 32 is retained in central socket 35, and the laterally spaced flanking sockets 27 retain the transverse bar 28 of the hitch frame 18 against vertical displacement. When abnormal draft load is encountered by the plow bottoms the pressure of the members 47 against rollers 45 is sufficient to rock jaw members 43 about spindle 42. As the members 43 rock about these pivots the outer edges of slanted faces 46 engage main leaf springs 51, secured to jaws 39 by bolts 52, auxiliary leaf springs 53 being also provided to increase tension on spring 51 when needed. Springs 51 oppose the rocking of members 43 about their pivots, and as the draft load increases rearward projections 54 on the jaw members 43 engage the sides of shaft 32, and rollers 45 move along the face of projections 47 away from shaft 32 until the latter is released. As soon as the center of roller 45 passes over the tip of projection 47 shaft 32 pulls away from the socket and spring 41 snaps the jaws together again.

The construction and operation of the plow structure of this invention should be clearly understood from the foregoing description. It should likewise be understood that modifications may be made in the invention without departing from the spirit thereof or the scope of the appended claims.

What is claimed is:

1. The combination with a tractor having an implement attaching structure forming a part thereof including laterally spaced socket members, of a two-part plow comprising a tool-carrying frame portion and a hitch portion, said hitch portion including a transverse bar member, a pair of laterally spaced rigid shaft members affixed to and projecting forwardly from said bar member adapted to be slidably received in said tractor socket members, and a third rigid shaft member affixed to and projecting rearwardly from said bar member between said forward shaft members, said tool-carrying frame portion having a socket member thereon to slidably receive and form an integral connection, releasable under overload, with said rearwardly projecting shaft member, and a pair of laterally spaced hook members mounted on said tool-carrying frame portion on opposite sides of said socket member adapted to partly encircle said transverse hitch bar to form therewith a rigid implement frame.

2. In a tractor-implement attachment wherein an implement part is releasable under overload from a hitch part to which the implement part is connected in draft-receiving relation, a socket member, a shaft member receivable in the socket member to form a releasable connection therewith, said shaft member having a pair of laterally spaced projections thereon, said socket member comprising a pair of laterally spaced pivoted jaws adapted to receive said shaft therebetween, spring means biasing said jaws closed, a pair of auxiliary jaw members pivotally mounted on said jaws, a pair of latch members carried by said auxiliary jaw members inwardly of the pivot axes of the latter and engageable with said projections, draft on the implement being effective to rock said auxiliary jaw members about their axes, and independently operating spring means mounted on said jaws and engageable with said auxiliary jaw member to resist the rocking thereof.

3. In a tractor-implement attachment wherein an implement part is releasable under overload from a hitch part to which the implement part is connected in draft-receiving relation, a socket member, a shaft member receivable in the socket member to form a releasable connection therewith, said shaft member having a pair of laterally spaced projections thereon, said socket member comprising a pair of laterally spaced pivoted jaws adapted to receive said shaft therebetween, spring means biasing said jaws closed, a pair of auxiliary jaw members pivotally mounted on said jaws, a pair of latch members carried by said auxiliary jaw members inwardly of the pivot axes of the latter and engageable with said projections, draft on the implement being effective to rock said auxiliary jaw members about their axes, and independently operating spring means mounted on said jaws and engageable with said auxiliary jaw member to resist the rocking thereof, and a part on each of said auxiliary jaw members engageable with the sides of said shaft after a predetermined rocking of said members in response to excess draft on the implement, said parts on the auxiliary jaw members having a camming action to force the jaws open.

References Cited in the file of this patent

UNITED STATES PATENTS

| | | |
|---|---|---|
| 2,602,389 | Markel | July 8, 1952 |
| 2,685,453 | Kuhary et al. | Aug. 3, 1954 |
| 2,724,315 | Roberson | Nov. 22, 1955 |
| 2,751,835 | Silver | June 26, 1956 |
| 2,777,376 | Schwegler | Jan. 15, 1957 |
| 2,897,903 | Bushmeyer | Aug. 4, 1959 |